Oct. 24, 1961  S. O. LINDERHOLM  3,005,868
STRESS DISTRIBUTION IN TERMINATING DEVICES
AND JOINTS FOR HIGH VOLTAGE CABLES AND
METHOD FOR PRODUCING SAME

Filed June 2, 1958  3 Sheets-Sheet 1

INVENTOR.
SVEN O. LINDERHOLM
BY
ATTORNEY

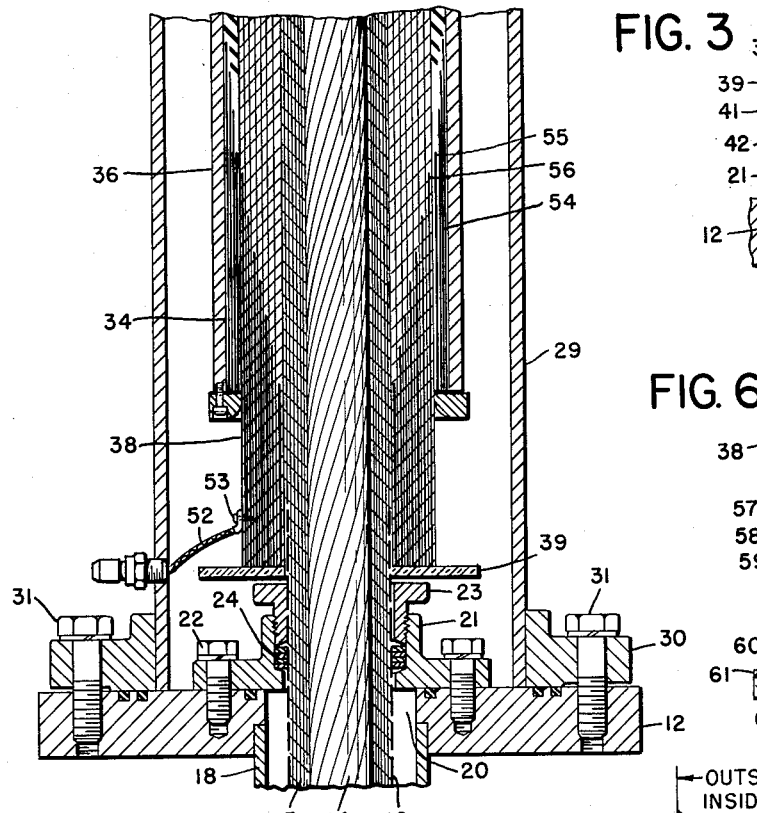
FIG. 2
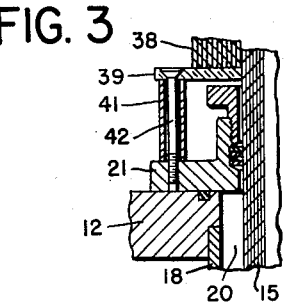
FIG. 3
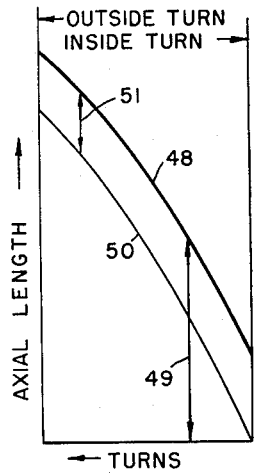
FIG. 6
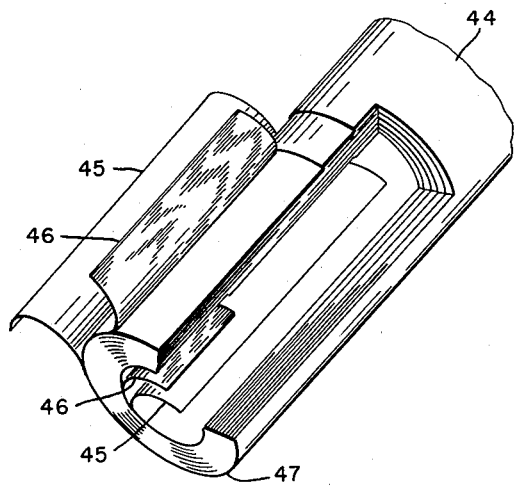
FIG. 4
FIG. 5
INVENTOR.
SVEN O. LINDERHOLM

*INVENTOR.*
SVEN O. LINDERHOLM
BY
ATTORNEY

United States Patent Office 3,005,868
Patented Oct. 24, 1961

3,005,868
STRESS DISTRIBUTION IN TERMINATING DEVICES AND JOINTS FOR HIGH VOLTAGE CABLES AND METHOD FOR PRODUCING SAME
Sven O. Linderholm, Mansfield, Ohio, assignor to The Ohio Brass Company, Mansfield, Ohio, a corporation of New Jersey
Filed June 2, 1958, Ser. No. 739,151
19 Claims. (Cl. 174—73)

This invention relates to terminals and joints for high voltage cables.

The principal object of the invention is to simplify the construction of high voltage cable terminations and joints and to reduce the cost thereof.

Another principal object of the invention is to control stress distribution in high voltage cable terminals and joints.

Still another object of the invention is to facilitate the utilization of high voltage cables for transmission of electric power by the provision of manufactured apparatus and accessories which eliminate the necessity for extensive hand work during installation.

In the utilization of high voltage cables for the transmission of electric power, considerations of design require the use of a fluid dielectric medium such as gas or oil. The known solid insulating sheet media do not possess sufficient strength to withstand the dielectric stresses in the absence of the fluid medium, so that certain complications are introduced in the design of terminating devices and joints for the cable.

Specifically, it is necessary to provide added insulation with suitable means for distributing the stresses in the cable insulation and in the added insulation in locations where the fluid dielectric medium is not present. For example, in potheads, suitable mechanical connections and means are provided for terminating the sheath and for maintaining the necessary oil or gas pressure within the cable externally of the pothead. The conductor or conductors of the cable and the surrounding insulation which extend into the pothead are provided with an added body of insulation, known as a build-up, to increase the radial extent of the insulation of the cable conductor, together with a means, known as a stress cone, for producing a suitable distribution of the stresses in the cable insulation proper and in the build-up.

In high voltage cable joints it is similarly necessary to provide a build-up about the joint between the conductors of the two cables, together with suitable stress distributing means at each end of the build-up.

It has heretofore been the practice to form the build-up by winding several layers of insulating tape about the cable insulation. Alternatively, there is utilized a so-called build-up tube in the form of a loose cylindrical winding of insulating paper which is positioned over the insulated conductor of the cable and then turned on the cable so as to wind the paper upon the conductor insulation. In either circumstance, the build-up is trimmed at its sheath end and wound with a metallic tape in order to form the stress cone which extends from the sheath to the radially outward part of the build-up.

Because of the fact that the distribution of the electrical stresses in the region defined by the stress cone is critical, the shaping of the build-up and the formation of the stress cone must be performed with extreme care. Experience has indicated that the gradation of the stress cone often departs substantially from the design configuration, with a consequent diminution of the performance characteristics and capabilities of the terminal. As a result, the cost of installing potheads and cable joints is not only substantial, but where rebuilding of the installation is necessary, may become quite excessive.

According to the present invention, the step of shaping the build-up and fabricating the stress cone is completely eliminated. Instead, the build-up tube incorporates a conducting foil between the turns of the winding of the insulating sheet material adjacent one end of the tube with at least one end of the tube in a plane perpendicular to the axis of the tube. According to one embodiment of the invention, the foil is co-extensive with the insulating paper from the interior of the winding to the exterior and also increases in axial length from the end of the tube progressively outwardly from the interior to the exterior of the winding according to a predetermined function of the tube thickness.

The build-up tube is applied over the end of the cable and positioned against an abutment or stop which is located adjacent the end of the sheath so that the cable shield, which extends over the cable insulation within the sheath itself, extends to a point just within the build-up tube. The build-up tube is then tightened in place and fixed by suitable means and the foil is connected to the cable sheath either directly or through the pothead or joint structure.

The increase in axial length of the foil in the radially outward direction of the build-up, e.g., for successive turns of the paper and foil, is such that the inner edge of the foil generates an equi-potential surface whose increase in radial distance from the conductor of the cable is determined by the distance from a fixed axial point, e.g., the adjacent surface of the abutment. The foil thus serves as a stress cone and the shape of the stress cone may be arbitrarily and exactly controlled by the shaping or positioning of the foil prior to or during the prior fabrication of the build-up tube. The particular predetermined function according to which the inner edge of the foil changes in distance from the end of the build-up tube can be ascertained in accordance with principles known to those skilled in the art to which this invention pertains.

The foil may be constituted either by a metallic sheet wound between the turns of the paper or by a conducting coating applied to the surface of the paper. According to the various embodiments of the invention, the foil may be either continuous from the interior to the exterior of the build-up tube or may be in discrete layers which are conductively connected.

It is a feature of the arrangement that the shape of the stress cone may be accurately determined with the assurance that the completed apparatus will conform to the engineering design. Further, this result is accomplished with a minimum expenditure of effort and time during construction or installation of the pothead.

The invention, together with further objects, features and advantages thereof, will be more readily apparent from the following detailed specification and claims taken in connection with the appended drawings in which:

FIG. 2 is an elevation view in section of a portion of the terminal of FIG. 1;

FIG. 3 is an enlarged view showing details particularly of the pothead of FIGS. 1 and 2;

FIG. 4 is a perspective view, partly broken away, of the build-up tube of the invention shown in connection with FIGS. 1 and 2;

FIG. 5 is a diagrammatic representation of the change in the axial length of the foil of the build-up tube as a function of the distance from the inside of the tube to the outside thereof;

FIG. 6 is a sectional view of one end of a build-up tube constituting an alternate embodiment of the invention;

Figure 1:
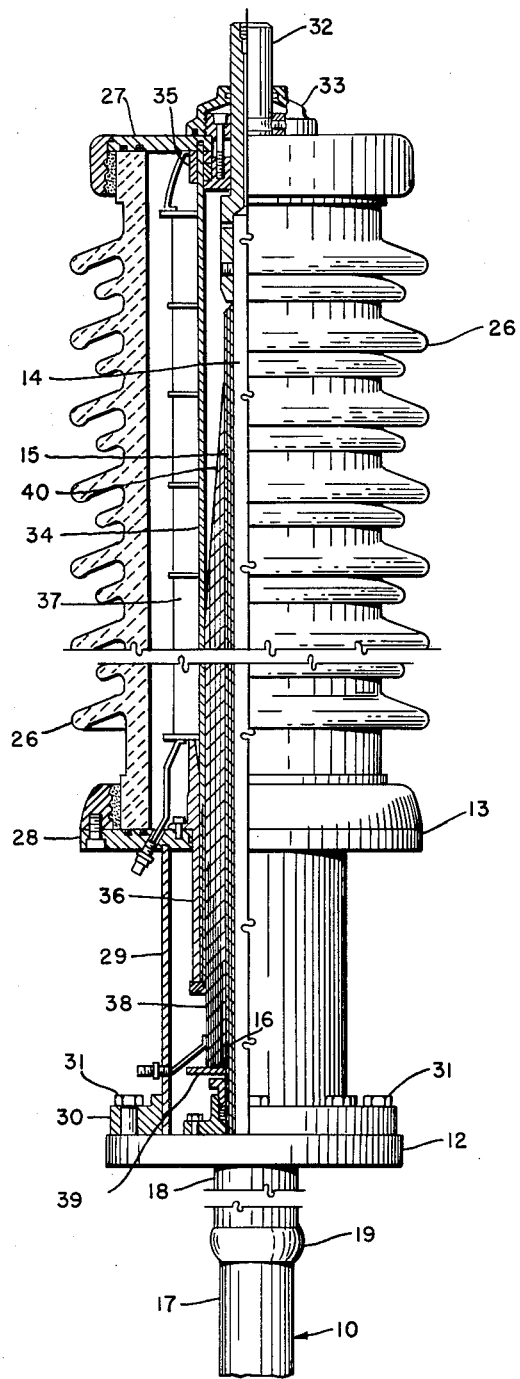
FIG. 1 is an elevation view partly in section of a high voltage power cable terminal.

Referring now to FIGS. 1 and 2, there is shown an electric power cable 10 with a mounting plate 12 and a pothead 13. The cable 10 is constituted by a central conductor 14, insulation 15, a shield 16 and a sheath 17. The mounting plate 12 includes a conduit 18 for receiving the cable 10, together with means, such as a wipe solder joint 19, to constitute a fluid tight connection between the conduit and the cable sheath. The conductor 14, with the insulation 15 and the shield 16, extends through the conduit 18 and an opening 20 in the base plate 12 into the pothead 13.

As shown particularly in FIG. 2, the conductor 14, insulation 15, and the shield 16 are clamped in place by means of a flange 21, which is secured to the mounting plate 12 by means of bolts 22. A compression ring 23 and packing 24 form a fluid tight joint and suitable means (not shown) is provided for the flow of a fluid insulating medium through the flange 21 to and from the interior of the conduit 18 and the cable 10.

The pothead 13 includes a housing 26, of porcelain, with a cover plate 27 at the top end and a base plate 28 at the bottom end of the housing, each suitably secured to the housing member by means of flanges and cemented joints. A tubular steel member 29 has its upper end received in an annular grove on the underside of the base plate 28 and is welded to the base plate. The tubular member 29 rests upon the mounting plate 12 and is welded to a flange 30 which is in turn secured to the mounting plate 12 by bolts 31. The pothead 13 is thus rigidly supported by the mounting plate 12.

The over plate 27 supports a terminal conductor 32 which extends through the top plate and is fitted over, and brazed or soldered to or compressed on, the conductor 14 at its upper end. A compressive sealing means 33 is provided between the terminal 32 and the cover plate 27 to permit sliding movement between the terminal and the top plate and accommodate differential movement of the housing and the cable conductor. The upper end of the terminal conductor 32 is utilized to make electrical connections to the external circuits.

A guide tube 34, disposed coaxially within the housing 26 and about the cable conductor 14 and insulation 15, is supported within the housing by means including a flange 35, carried by the top plate 27 at the upper end of the housing, and a guide tube holder 36, carried by the base plate 28 at the lower end of the housing. The guide tube 34 is constituted by a suitably wound and impregnated paper tube which is sufficiently rigid to support the grading capacitors 37. The guide tube incorporates suitable grading foils at its lower end to provide a proper distribution of electric stresses between the cable conductor and the guide tube, as hereinafter described.

A build-up 38 is arranged about the insulation 15 and extends from an abutment or stop 39 coaxially along the exterior of the cable and between the cable insulation 15 and the guide tube 34 toward the upper end of the conductor. The build-up 38 may be tapered at its upper end, indicated at 40, to conform to the reduction in stresses at that location, as is known in the art.

The grading capacitors 37 are connected in series between the base plate 28 and the cover plate 27 in order to control the longitudinal distribution of stresses in the insulating medium.

As shown particularly in FIG. 3, the stop 39 is supported by the flange 21 and is spaced therefrom by means of a spacer 41 and a screw 42. The spacer 41 and screw 42 are located forty-five degrees in rotation from the cap screws 22, shown in FIG. 2, and similar spacers and screws are provided at spaced points around the circumference of the stop 39 and the flange 21.

Referring to FIGS. 2 and 4, the build-up tube 44 of the invention comprises a continuous winding constituted by a sheet 45 of insulating paper. The tube may be formed initially upon a mandrel having an outside diameter greater than that of the insulation 15 of the cable 10. In the showing of FIG. 4, which has the dimensions thereof somewhat modified from the showing of FIG. 2 for the purpose of clarity, the foil is interposed between the turns of the winding 45 in the form of a thin metallic sheet 46. The sheet 46 is incorporated in the build-up tube during the fabrication by continuously winding the metallic sheet with the paper. The sheet 46 is initiated after the start of the paper at the inside of the tube and terminated prior to the termination of the paper winding at the outside of the tube so as to provide a paper overlap for protection of the metallic sheet.

The utilization of a metallic sheet 46 represents one form of the invention. Alternatively, a paper may be used which incorporates a conducting layer on a surface thereof as, e.g., a metallized or an ink coating applied to the paper. The particular construction utilized is ordinarily dependent upon practical considerations, although either form has certain advantages and disadvantages with respect to the other in the practice of the present invention. The term "foil," which will be used hereinafter, is intended to refer to either construction.

Referring to FIG. 5, the distance along the vertical coordinate represents distance from the end 47 of the build-up tube, whereas the horizontal coordinate represents the thickness of the wall of the tube. Thus, the curve 48, with the associated arrow 49, represents the change in axial length of the metallic sheet 46 in FIG. 4 in proceeding from the inside turn of the tube to the outside turn. Since the foil extends inward from the end 47 of the build-up tube, the curve 48, with the arrow 49, indicates the distance the foil extends in from the bottom end of the tube as well as the total axial length of the foil from its inner edge to its outer edge.

Curve 50 and arrow 51 represent an alternative embodiment of the invention in which the foil does not extend to the end 47 of the build-up tube at its outer edge, but outward only for a distance sufficient to provide an adequate overlap of the successive turns. Thus, the curve 48 indicates the change in distance of the inner edge of the foil from the bottom end of the build-up tube, whereas the curve 50 indicates the distance the outer edge of the foil from the bottom end of the build-up tube, in proceeding from the inside turn to the outside turn of the tube. The embodiment of the invention represented by the curve 50 and the arrow 51 effects a substantial reduction in the amount of foil required in the winding and is best utilized where the foil is constituted by a separate metallic sheet of constant width.

In practicing the invention, the termination is prepared by removal of the sheath from the cable; the mounting plate 12 is secured in position with the cable end extending through the opening 20 and the flange 21; the compression ring 23 is tightened upon the gasket 24 to hold the cable; and the abutment 39 is then secured to the flange 21.

The build-up tube 44 is installed by sliding the tube over the end of the conductor 14 and insulation 15 and the end 47 is positioned against the abutment 39. The inside turn of the paper 45 is secured to the exterior of the insulation 15 by an adhesive or the like or is held at its upper end. The build-up tube is then turned upon the cable with its bottom end resting on the abutment 39, and the paper and foil winding is tightened firmly upon the cable insulation. The winding is then held in place while a ground connection is made to the foil such as by the conductor 52 and screw 53. The pothead 13 is then lowered over the end of the cable and secured in place on the mounting plate 12 by means of the bolts 31. The build-up may be fixed in place either by means of a clamp applied below the guide tube holder 36 or by the guide tube itself. The guide tube paper is ordinarily oil impregnated and will remain in the tightened position for a sufficient period to permit the pothead to be lowered into place.

In the installation of the build-up tube the tightening of the winding does not disturb the relative position of the edges of the foil, but merely brings the paper and the foil into closer proximity to the cable insulation and conductor. Thus, the distance of the inner edge of the foil is maintained in the same relation to the end of the build-up, and hence to the stop 39, as in the preformed build-up tube. Displacement or distortion of the stress cone, because of the mechanical placement of the pothead over the end of the cable, is not possible.

The guide tube 34 comprises a member in which a resin coated paper or the like is wound with a foil insert similar to that utilized in the build-up tube 38. The tube is, however, completed and baked and assembled in the pothead 13 in the factory, so that the guide tube forms an integral part of the pothead at the time of installation. The foil 54 of the guide tube and the foil of the build-up are of such initial and final axial lengths, respectively, that the innermost turn of the foil of the guide tube is disposed above the outermost turn of the foil of the build-up. This is indicated at 55 and 56 in FIG. 2 and assures the necessary uniformity of stress distribution in the transition region between the build-up tube and the guide tube. The foil 54 is, of course, suitably grounded to the cable sheath through the guide tube support 36 and the end plate 28.

After the build-up tube is tightened on the cable, the outside turns are adjusted so that the build-up fits tightly in place on the cable while permitting oil movement adjacent the guide tube. Consequently, free oil paths within the guide tube are outside the highly stressed region adjacent the cable insulation and there is no free oil path in a highly stressed area within the guide tube which is liable to breakdown.

The invention may be practiced by reversing the foil 46 in the original winding of the build-up tube 38 so that the wider end of the foil is on the inside of the tube and the narrower end on the outside. The build-up tube is then applied to the cable by attaching the outside turn of the paper and foil to the insulation of the cable, and the tube 38 is moved circumferentially about the cable to unwind the tube and simultaneously rewind the paper and foil upon the cable insulation. The same precautions are necessary with respect to maintaining the paper in engagement with the abutment 39 so as to correctly position the upper edge of the foil. This latter method suffers some objection because of the length of time required for a complete rewinding of the build-up tube upon the cable, so that the former method is preferred. However, the procedure is in accordance with the principles of the invention and is of use in certain circumstances.

According to the invention of FIG. 6, the foil is not wound continuously with the paper but in the form of separate sheets, each at least one turn in length, inserted at appropriate intervals when winding the build-up tube. The foil forms discrete coaxial cylinders, such as the cylinders 57, 58 and 59 in FIG. 6, with the inner ends of the cylinders arranged to form the stress cone and provide the desired stress distribution, as previously described. The cylinders are connected together either by tabs or, when metallic sheets are utilized, by permitting the sheets to project beyond the edge of the paper, as at 60. The tabs or sheets are arranged to contact a metal plate 61 on the adjacent surface of the abutment 62, which otherwise corresponds to the abutment 39. A conductor such as the conductor 52 of FIGURE 2, is then connected to the plate 61. Since the coaxial foils are connected together, the arrangement differs from those of the prior art wherein separate coaxial concentric foils were utilized to grade radial stresses in bushings, potheads and related apparatus.

Figure 7:
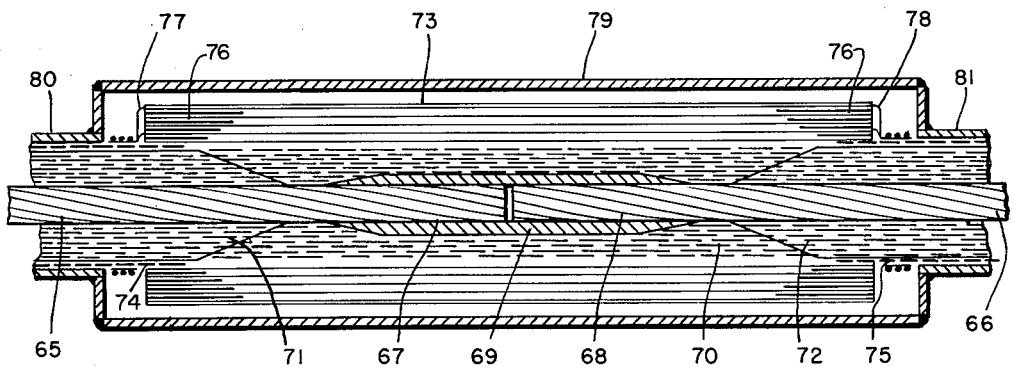
FIG. 7 is a sectional view of a cable joint embodying the invention.

Referring now to FIG. 7, there is shown an embodiment of the invention in which a build-up tube, formed in accordance with the principles heretofore set forth, is utilized in the construction of a joint between the ends of two high voltage cables 65 and 66. The joint is shown in its completed form, in which the two conductors 67 and 68 of the cables are connected together by means such as a compression splice 69. A winding of insulating tape over the joint 69 forms a body 70 of insulation flush with the insulation 71 and 72 of the two cables 65 and 66. A build-up 73 is arranged over the insulation 70, 71 and 72 and over the adjacent ends of the shields 74 and 75 of the two cables. The foils 76 of the build-up tube are connected to the shield 74 by means such as the tabs 77 and to the shield 75 by means such as the tabs 78. An oil-tight cover 79 encloses the build-up tube and is attached to the sheaths 80 and 81 of the two cables by any suitable means, as is known in the art. The showing of the cover 79 is intended to be diagrammatic only.

Figure 8:
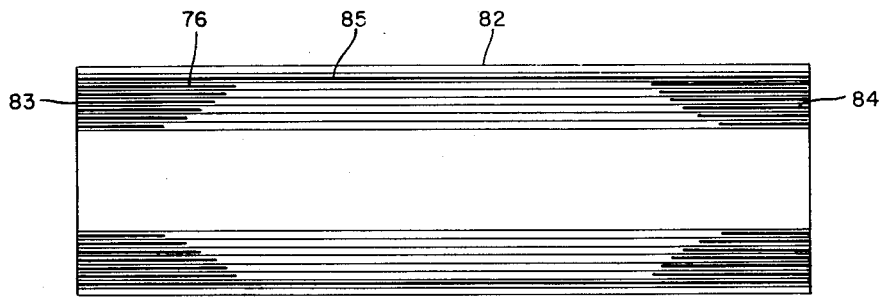
FIG. 8 is a sectional view of the build-up tube utilized in the joint of FIG. 7.

As is shown in FIG. 8, the build-up tube 82 is similar to the build-up tube 38 of FIG. 4, e.g., as a winding of insulating paper with an interdispersed continuously wound foil 76. The foil 76 is, however, wound in three parts, including a foil 83 at the one end of the build-up tube, associated with the cable 65, a foil 84 at the remaining end of the tube, associated with the cable 66, and a foil 85 connecting the two foils 83 and 84. The foils 83 and 84 increase in axial length, proceeding from the inside to the outside of the tube, to constitute a shield cone, as has been heretofore described. The foil 85 may constitute a continuation of the foils 83 and 84, or a separate foil in contact with the outward turns of those foils. Foil 85 serves to confine stresses within the build-up tube so that the stress distribution of the joint, as finally constructed, is determinate and in accordance with the prior design. Otherwise, the stresses would exist between the conductors 67 and 68, and the joint 69 on one side, and the cover 79 on the other side, and would be subject to a considerable variation, depending upon the particular installation.

The build-up tube is initially wound with an inside diameter such that the tube may be placed over one of the cables 65 and 66 after the ends of the cables are prepared and before the conductors 67 and 68 are spliced together. Upon completion of the splice and the formation of the body of insulation 70, the build-up tube is slid into the final position, indicated in FIG. 7, and tightened into place. The cover 79 and the end plates are similarly placed over the cables and moved into final position and soldered or brazed into place after the build-up is completed and the connections made from the foils to the shield.

The utilization of the invention in the construction of high voltage cable joints, as illustrated in FIGS. 7 and 8, has the same advantages heretofore set forth in connection with the cable terminal of FIG. 1.

The preformed tubular arrangement of FIG. 4 or FIG. 8, constituted by a wound assemblage of sheet insulating material and sheet conducting material in discrete or metallized form, is designated herein as a build-up tube. After installation on a cable, the same arrangement is designated as a build-up.

It is to be understood that the foregoing description is not intended to restrict the scope of the invention and that various rearrangements of the parts and modifications of the design may be resorted to. The following claims are directed to combinations of elements or procedures which embody the invention or inventions of this application.

I claim:

1. That method of forming a build-up and stress cone on a cable, which includes as steps thereof, providing a preformed build-up tube in the form of a winding of paper which paper is continuous from one edge of the winding to the other, with an edge of the paper which forms one end of the tube in a plane perpendicular to the axis of the tube, and with stress distributing foil adjacent the paper with its inner edge progressively more distant from said end of the tube from the inside of the tube to its outside, positioning the tube concentrically over and end of the cable with said end of the tube abutting a flat surface, holding the innermost turn of the tube with respect to the cable, and tightening the windings of the tube on the cable with said end of the tube abutting said flat surface.

2. That method of forming a build-up and stress cone on a cable, which includes as steps thereof, providing a preformed build-up tube constituted by a composite winding of sheet insulating material and interposed sheet conducting material, the distance of the inner edge of the conducting material from the one edge of the insulating material which forms one end of the tube increasing according to a predetermined function of the turns of the winding, positioning the tube concentrically over the cable with abutment means fixing the position of said end of the tube relative to the cable and turning the tube on the cable to tighten the said winding onto the cable while maintaining said edge of the insulating material in contact with the abutment, all for maintaining the predetermined disposition of the conducting material when the build-up tube is in place.

3. That method of forming a build-up and stress cone on a cable, which includes as steps thereof, providing a preformed build-up tube constituted by a composite winding of continuous sheet insulating material and sheet conducting material with one edge of the insulating material and the conducting material coinciding at one end of the tube in a plane perpendicular to the axis of the tube with the distance of the inner edge of the conducting material from said edge of the insulating material increasing in proceeding from the interior of the winding to the exterior, providing a relatively fixed abutment means about the cable, positioning the tube concentrically over the cable with said end against the abutment means, winding the sheet material of the build-up tube upon the cable by turning the build-up tube on the cable with said end of the build-up tube in contact with the abutment means for transferring the said insulating and conducting materials to the cable in the same relative disposition as in the preformed tube and in a determinate location on the cable, and fixing the sheet material so wound upon the cable to constitute a permanent build-up with the conducting material defining a stress cone about the conductor of the cable.

4. The method of claim 3 in which said end of the build-up tube rests on the abutment means as the sheet material thereof is transferred to the cable.

5. That method of forming a build-up and stress cone on a cable, which includes as steps thereof, providing a preformed build-up tube constituted by a compoiste winding of continuous sheet insulating material and interposed conducting material with one edge of the insulating material and the conducting material coinciding at one end of the tube in a plane perpendicualr to the axis of the tube with the distance of the inner edge of the conducting material from said edge of the insulating material increasing from one end of the conducting material to the other according to a predetermined function of the turns of the winding, providing a relatively fixed abutment means about the cable and rewinding the sheet material of the build-up tube upon the cable by moving the build-up tube circumferentially about the cable in contact with the abutment means at the one end thereof for preserving the predetermined disposition of the inner edge of the conducting material to constitute a permanent build-up with the conducting material defining a stress cone about the conductor of the cable.

6. The method of claim 5 in which said end of the build-up tube rests on the abutment means as the tube is rewound.

7. The method of forming a build-up about a cable from a build-up tube the winding of which forms an end of the tube which is perpendicular to its axis, which method comprises transferring the winding from the tube to a cable while concentric therewith and while said end of the tube is resting on a plane surface perpendicular to the axis of the cable.

8. A build-up tube for use with a high voltage cable constituted by a preformed cylindrical winding of sheet insulating material which is continuous from one edge thereof to the other and a foil of conducting material coextensive with the insulating material throughout a substantial part of the turns thereof, one end of the tube being perpendicular to the axis of the tube, the inner edge of the foil being disposed progressively more distant from said one end of the tube according to a predetermined function of the turns of the winding to constitute a ground surface having a predetermined change of radial distance from the conductor of the cable with respect to distance along the cable, all for subsequent winding on the insulation of the cable to constitute an insulated portion of increased diameter therefor.

9. The invention in accordance with claim 8 in which the foil is continuous throughout its length to constitute a single conducting piece.

10. The invention in accordance with claim 8 in which the foil is in the form of a plurality of separate conducting pieces coaxial each with the other.

11 The invention in accordance with claim 8 in which one edge of the foil and one edge of the insulating material coincide at said end of the tube which is perpendicular to its axis.

12. In an arrangement for a cable end including as parts thereof a conductor of the cable and insulation therefor, a build-up constituted by a continuous cylindrical winding of sheet insulating material upon the insulation of the cable, which sheet of insulating material is continuous from one edge thereof to the other, one edge of a conducting foil coinciding with an edge of the sheet insulating material at one end of the winding which lies in a plane perpendicular to the axis of the winding, and the inner edge of the foil increasing in distance from said end of the winding, proceeding in a radially outward direction from the cable, to constitute a built-in stress cone for the increased radial thickness of insulation about the cable insulation constituted by the build-up.

13. An arrangement for a cable end, including as parts thereof a conductor of the cable and insulation therefor, abutment means fixed with respect to the cable at a predetermined point along the cable, a build-up constituted by a continuous cylindrical winding of sheet insulating material upon the insulation of the cable, with one end of the winding positioned against the abutment means with the abutment extending outward beyond the outer edge of the build-up, and a conducting foil co-extensive with the insulating material throughout at least more than one turn thereof and the inner edge of the foil increasing in distance from the abutment and the end of the tube, proceeding in a radially outward direction from the cable, to constitute a built-in stress cone for the increased radial thickness of insulation about the cable insulation constituted by the build-up.

14. The arrangement of claim 13 in which the surface of the abutment means against which the end of the winding is positioned is in a plane perpendicular to the axis of the cable.

15. In an arrangement for a cable end including as parts thereof a conductor of the cable and insulation therefor, and a build-up constituted by a continuous cylindrical winding of sheet insulating material upon the insulation of the cable, which sheet of insulating material is continuous from one edge thereof to the other, a conducting foil coextensive with the said insulating material at one end of the winding which lies in a plane perpendicular to the axis of the winding, the said foil being progressively spaced from the said end of the winding and the inner edge of the foil increasing in distance from said end of the winding, proceeding in a radially outward direction from the cable, and the said foil overlapping itself in successive turns thereof to constitute a built-in stress cone for the increased radial thickness of insulation about the cable insulation constituted by the build-up.

16. In a high voltage cable terminal, a pothead including a terminal conductor at the upper end, a base plate at the lower end, and a guide tube extending along the interior thereof, a cable comprising a central conductor, a sheath and insulation coaxially between the sheath and conductor, the insulation and central conductor extending through the guide tube and the central conductor attached to the terminal conductor, coaxial connecting means secured to the base plate of the pothead and to the cable sheath, and a build-up disposed coaxially between the cable insulation and the guide tube and resting on an abutment which extends outwardly about the guide tube in a fixed position, said build-up comprising a continuous winding of sheet insulating material tightly fitted within the guide tube and having the inner turn of the winding tightly engaged with the insulation of the cable and the lower edge thereof terminating adjacent the connecing means, the said build-up incorporating a stress distributing foil between the turns of the winding at the lower edge thereof, which lower edge of the foil coincides with said lower edge of the sheet of insulating material and increases in axial length from said end of the build-up in proceeding from the interior of the winding to the exterior thereof, the winding terminating at a point closely adjacent the base plate of the pothead, all for providing a uniform distribution of stresses in the insulation and build-up and eliminating highly stressed oil paths between the connecting means and the terminal conductor.

17. The invention in accordance with claim 16 in which the guide tube is supported at its lower end by a grounded coaxial guide tube holder and incorporates grounded stress distributing foils of increasing length between the foils of the build-up and the guide tube holder, with the innermost foil of the guide tube extending above the outermost foil of the build-up to prevent a stress discontinuity therebetween.

18. In a high voltage insulated cable terminal, a pothead which includes a terminal conductor at its upper end which is attached to the cable, a base plate at its lower end, a build-up around the insulated cable and adjacent its end, a guide tube which encloses at least a portion of the length of the build-up, an abutment in a fixed position around the cable near the base plate on which abutment the build-up rests, the build-up comprising a continuous winding of sheet insulating material with its inner turn tightly engaged with the insulation of the cable with stress-distributing conducting material between the turns of the winding, all for providing a uniform distribution of stresses in the insulation and build-up.

19. In a high voltage insulated cable terminal, a pothead which includes a terminal conductor at its upper end which is attached to the cable, a base plate at its lower end, a build-up around the insulated cable and adjacent its end, an abutment in a fixed positoin near the base plate on which abutment the build-up rests, the build-up comprising a continuous winding of sheet insulating material with its inner turn tightly engaged with the insulation of the cable and with stress distributing conducting material between the turns of the winding, all for providing a uniform distribution of stresses in the insulation and build-up.

References Cited in the file of this patent

UNITED STATES PATENTS

| 1,589,505 | Atkinson | June 22, 1926 |
| 1,655,258 | Boyle | Jan. 3, 1928 |
| 2,086,078 | Haefely | July 6, 1937 |
| 2,222,718 | Phillips | Nov. 26, 1940 |
| 2,386,185 | Beaver et al. | Oct. 9, 1945 |

FOREIGN PATENTS

| 312,495 | Great Britain | May 30, 1929 |
| 452,396 | Great Britain | Aug. 21, 1936 |
| 612,059 | Great Britain | Nov. 8, 1948 |
| 690,022 | Great Britain | Apr. 8, 1953 |
| 778,579 | Great Britain | July 10, 1957 |